C. F. GAILOR.
RAIL JOINT.
APPLICATION FILED FEB. 3, 1913.
1,070,445.
Patented Aug. 19, 1913.
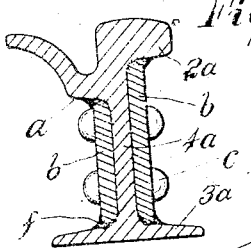
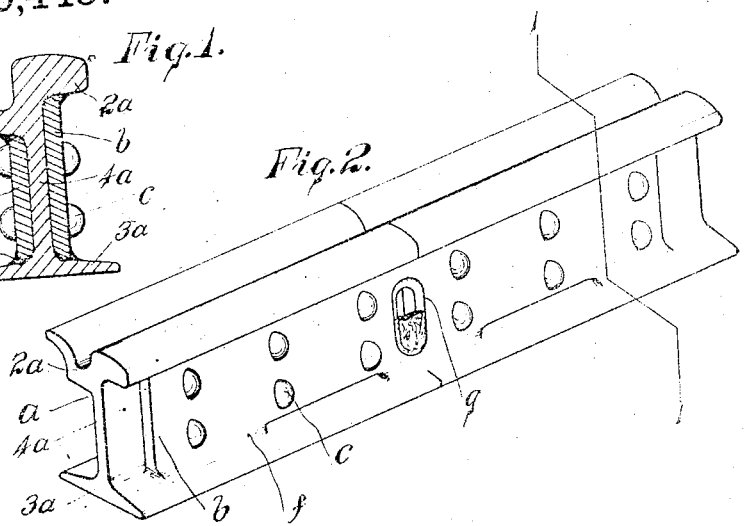
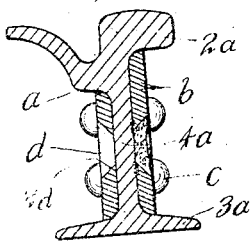
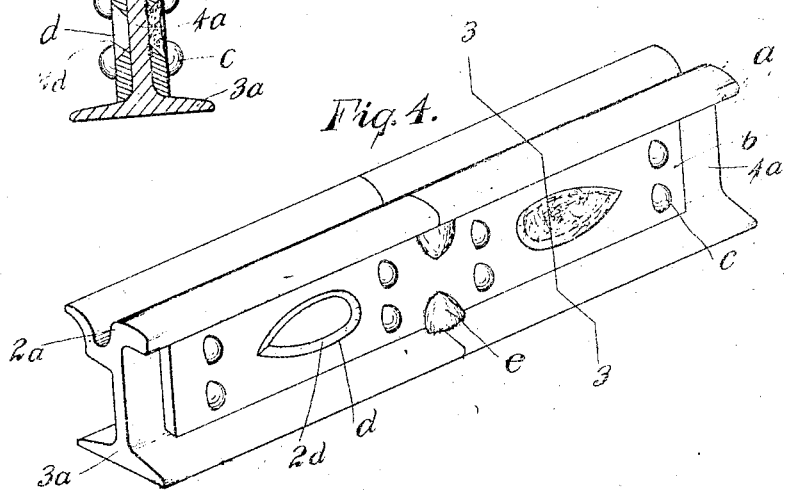
WITNESSES
INVENTOR
Chester F. Gailor
BY
ATTORNEY

UNITED STATES PATENT OFFICE.

CHESTER F. GAILOR, OF HARTFORD, CONNECTICUT.

RAIL-JOINT.

1,070,445.    Specification of Letters Patent.    Patented Aug. 19, 1913.

Application filed February 3, 1913. Serial No. 745,785.

*To all whom it may concern:*

Be it known that I, CHESTER F. GAILOR, a citizen of the United States, and a resident of Hartford, in the county of Hartford and State of Connecticut, have invented certain new and useful Improvements in Rail-Joints, of which the following is a specification.

This invention relates to improvements in welded rail joints, the object being to provide a more perfect union of the parts in order to produce a joint of the greatest strength and conductive capacity.

Heretofore it has been proposed to weld a boss on the inner side of a fish plate to the web of a rail by passing electric current through the fish plate and boss and the web to produce a welding heat, and then force a union of the parts by subjecting them to great pressure. This may well be termed an indirect process, and is exemplified in U. S. Patent No. 616,435.

My invention may well be termed a direct process since it provides means for directly fusing the contacting surfaces together, making it possible to carefully watch and inspect the progress of the work and thus insure a perfect union of the parts.

In carrying out my invention I form welding apertures through the body of the fish plates of such size as to permit of inserting a welding tool or electrode at the very line of contact between the fish plates and the rail webs, which permits of directly fusing the parts together. The aperture is then gradually filled in with welding material, uniting the fish plates and rails in an integral structure of large area. It is very desirable that the welding apertures be arranged with their longest dimension extending in a general longitudinal direction to provide greater strength to withstand the heavy shearing strains occasioned by the longitudinal contraction and expansion of the rails.

A further feature of the invention is to be found in providing a notch in either or both edges of the fish plates at the rail joint, which notches overlap the rail ends, making it possible to produce a direct weld of the fish plates to the rails along the boundaries of the notches, which are gradually filled in with welding material as the process continues, binding the parts together into an integral structure with a weld of substantial area at this point where the rails are subjected to great distortion, due to the transfer of a load from one to the other. At the joint of the rails the shearing strain is in a vertical direction as the load is transferred to one or the other, and it is advisable here to have the weld extend in a general vertical direction so as to give added strength to withstand this shearing strain. In the cases of the notches in the edges of the rails this effect is produced, and if desired a welding aperture can be formed in the fish plate at the joint, the longer dimension of which extends in a general direction transversely of the fish plate. It is to be understood that usually the fish plates fill the space between the head and base of the rail, and if desired the edges of the fish plates may be welded thereto.

As a convenient way of giving access for the welding tool to the contacting faces of the parts to be welded, I bevel the edges of one part, and then gradually fill in with welding material as the welding operation is continued. This can be done wherever the junction between the two parts to be welded is difficult of access.

It is to be understood that the fish plates are usually bound to the rails by rivets, bolts, or similar fastening means. In the old welded joints these fastening means were subjected to enormous shearing strain in a longitudinal direction, occasioned by the expansion and contraction of the rails, and those fasteners nearest the joint were subjected to enormous shearing strain in a vertical direction as the load was transferred from one rail to the other. By the invention as here described all parts of the complete joint tend to support and strengthen one another and in addition provide an integral structure producing the proper conductivity in the rail which is necessary in electrical systems.

In the drawings Figure 1 is a transverse sectional view of one rail joint. Fig. 2 is a perspective view thereof. Fig. 3 is a transverse sectional view of another rail joint. Fig. 4 is a perspective view thereof.

In the drawings $a$ denotes the rail, $2^a$ the head, $3^a$ the base, and $4^a$ the web; $b$, $b$, denote the fish plates, $c$ the fastening devices, here shown as rivets; $d$ denotes the welding apertures through the body of the fish plates. $2^d$ indicates the beveled edge of these apertures; $e$ denotes the notches in the edges of the fish plates at the rail joint;

$f$ denotes spaced welds between the edges of the fish plates and the head and base of the rail; $g$ denotes a welding aperture at the rail joint with its longer dimension extending transversely of the fish plate.

I claim as my invention:

1. That improvement in the art of uniting rails and fish plates which consists in placing the rails end to end in alinement with each other, locating fish plates against the sides of the rail webs to overlap the ends thereof, securing said fish plates to said rails by headed fasteners, forming welding apertures through the body of said fish plates, and welding the contacting surfaces of the fish plates and rail webs within the apertures.

2. That improvement in the art of uniting rails and fish plates which consists in placing the rails end to end in alinement with each other, locating fish plates against the sides of the rail webs to overlap the ends thereof, securing said fish plates to said rails by headed fasteners, forming notches in one edge of said fish plates at the joint between the rail ends, welding said fish plates to the rails along the boundaries of said notches, and welding the fish plates to the rails at other points.

3. That improvement in the art of uniting rails and fish plates which consists in placing the rails end to end in alinement with each other, locating fish plates against the sides of the rail webs to overlap the ends thereof, securing said fish plates to said rails by headed fasteners, and welding said fish plates to said rails, the edge of said fish plates along the parts to be welded being outwardly beveled.

4. That improvement in the art of uniting rails and fish plates which consists in placing the rails end to end in alinement with each other, locating fish plates against the sides of the rail webs to overlap the ends thereof, securing said fish plates to said rails by headed fasteners, forming welding apertures through the body of said fish plates at either side of the joint, welding the contacting surfaces of the fish plates and rail webs within the apertures, the longer boundaries of said apertures being disposed in the general direction of the length of the fish plates.

5. That improvement in the art of uniting rails and fish plates which consists in placing the rails end to end in alinement with each other, locating fish plates against the sides of the rail webs to overlap the ends thereof, forming welding apertures through the body of the fish plates and welding notches in the edges thereof at the rail joint, welding fish plates to said rails along the boundaries of the apertures and notches, and gradually filling in said apertures and notches.

6. That improvement in the art of uniting rails and fish plates which consists in placing the rails end to end in alinement with each other, locating fish plates against the sides of the rail webs to overlap the ends thereof, forming welding apertures in the body of the fish plates with their longer dimension extending in a general longitudinal direction, forming welding notches in the edges of the fish plates at the rail joint, with their longer dimension arranged in a general direction transversely of the fish plates, and welding the contacting surfaces of the fish plates and rail webs along the boundaries of said apertures and notches.

7. That improvement in the art of uniting rails and fish plates which consists in placing the rails end to end in alinement with each other, locating fish plates against the sides of the rail webs to overlap the ends thereof, forming welding apertures in the body of the fish plates and notches in the edges thereof at the rail joint, the bounding edges of said apertures and notches being outwardly beveled.

8. That improvement in the art of uniting rails and fish plates which consists in placing the rails end to end in alinement with each other, locating fish plates against the sides of the rail webs to overlap the ends thereof, securing said fish plates to said rails by headed fasteners, forming notches in one edge of said fish plates at the joint between the rail ends, and welding said fish plates to the rails along the boundaries of said notches.

9. That improvement in the art of uniting rails and fish plates which consists in placing the rails end to end in alinement with each other, locating fish plates against the sides of the rail webs to overlap the ends thereof, securing said fish plates to said rails by headed fasteners, forming a welding aperture through the body of said fish plates at the joint, the longer dimension of said aperture extending in a general direction transversely of the fish plates, and welding said fish plates to the ends of both rails within said aperture.

CHESTER F. GAILOR.

Witnesses:
H. E. HART,
A. E. O'BRIEN.